Figure 1:
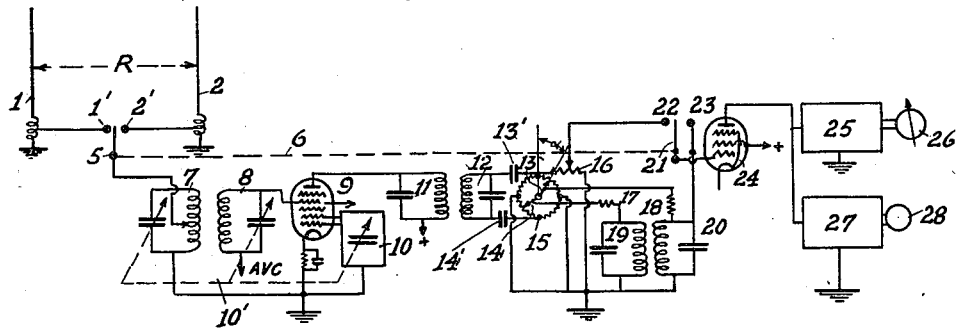

May 26, 1942.  J. PLEBANSKI  2,284,475

RADIO DIRECTION FINDING SYSTEM

Filed June 20, 1940  4 Sheets-Sheet 1

INVENTOR
JOZEF PLEBANSKI
BY
ATTORNEY

May 26, 1942. J. PLEBANSKI 2,284,475

RADIO DIRECTION FINDING SYSTEM

Filed June 20, 1940 4 Sheets-Sheet 2

INVENTOR
*JOZEF PLEBANSKI*
BY
ATTORNEY

May 26, 1942.    J. PLEBANSKI    2,284,475
RADIO DIRECTION FINDING SYSTEM
Filed June 20, 1940    4 Sheets-Sheet 3
FIG. 7.
FIG. 8.
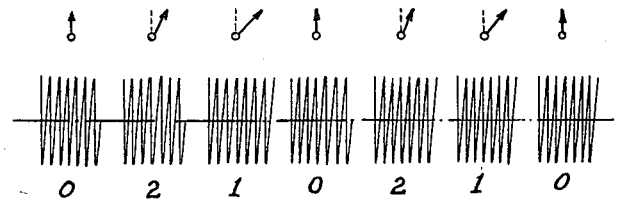
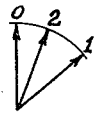
FIG. 9.
FIG. 10.
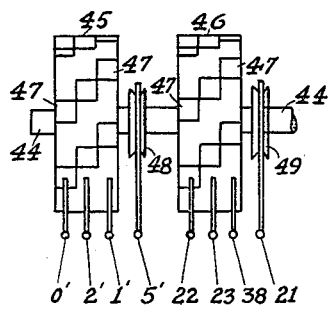
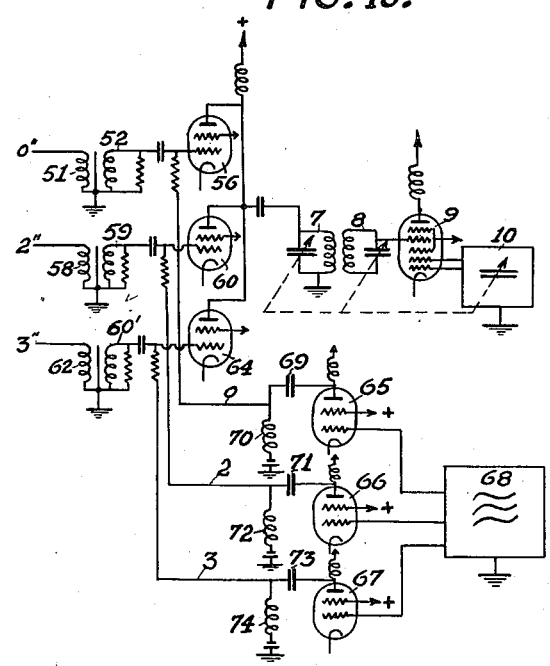
INVENTOR
JOZEF PLEBANSKI
BY
ATTORNEY May 26, 1942. J. PLEBANSKI 2,284,475
RADIO DIRECTION FINDING SYSTEM
Filed June 20, 1940   4 Sheets-Sheet 4

INVENTOR
JOZEF PLEBANSKI
BY
ATTORNEY

Patented May 26, 1942

2,284,475

UNITED STATES PATENT OFFICE 2,284,475

RADIO DIRECTION FINDING SYSTEM

Jozef Plebanski, Warsaw, Poland

Application June 20, 1940, Serial No. 341,488
In Poland April 26, 1939

4 Claims. (Cl. 250—11)

The present invention relates to a system for and method of directionally receiving radio signals, more particularly to direction finding systems of the type comprising a plurality of spaced receiving antennae energizing or feeding a common receiver.

An object of the invention is the provision of a novel method of and system for direction finding utilizing spaced antennae elements which is both simple in design and efficient in operation compared with the arrangements heretofore known in the art.

With this general object in view, the invention involves the use of a wireless receiver preferably of the superheterodyne type arranged to be alternately connected to two or more spaced antennae at a predetermined preferably supersonic frequency. Due to the fact that in spaced antenna systems the relative phase of the signal energies absorbed by the separate antenna elements varies as a function of the direction of propagation of the signals being received, the signal developed in the receiver according to the invention will be phase modulated in addition to the usual signal modulation. This phase modulation is suitably detected and measured by actuating an indicator such as a pair of head phones, a volt meter, cathode ray tube or the like. Alternatively, the receiver is provided with means for compensating or cancelling the additional phase modulation caused by the alternate connection of the antenna elements to the receiver circuit, the phase shift necessary to effect such compensation being characteristic of the direction of incidence of the signals being received.

In practicing the invention a single pair of spaced aerials are sufficient to determine the direction of an arriving radio signal. However, a system of this type possesses an inherent ambiguity due to the fact that signals arriving at an angle $+\alpha$ with respect to the connecting line of the aerials will result in the same direction indication as signals arriving at an angle $-\alpha$ with respect to the line connecting the aerials. This ambiguity may be eliminated by the use of three aerials located at the corners of a triangle as will be described in detail hereafter.

Accordingly, another object of the invention is the provision of a direction finding system embodying a direction indicator operating over a complete angle of 360° without any ambiguity of the direction indication.

Figure 2:
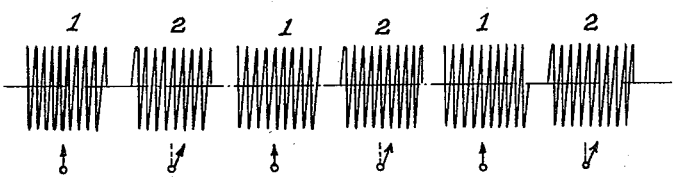
Figure 3:
Figure 4:
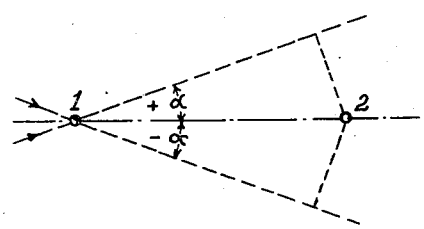
Figure 5:
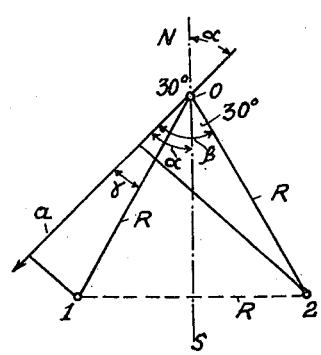
Figure 6:
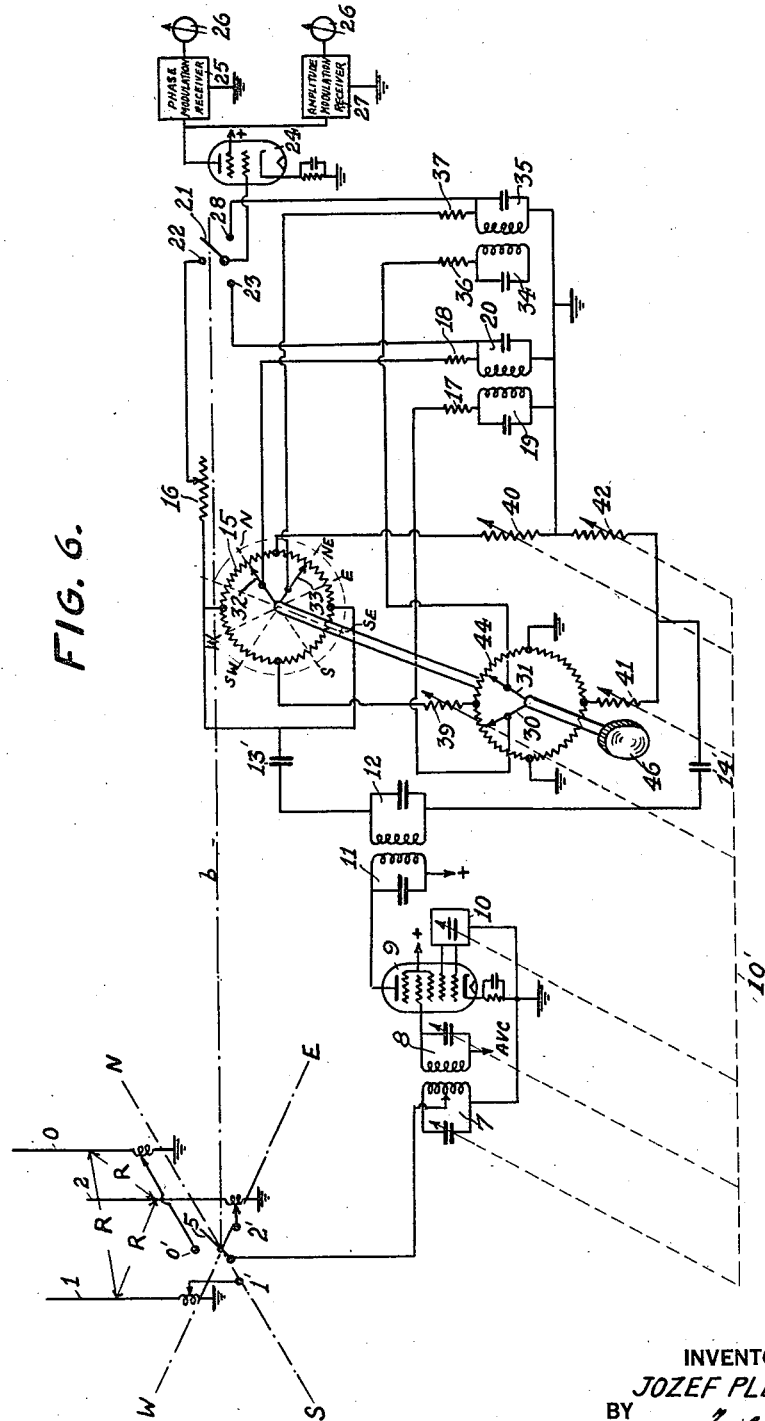
Figure 11:
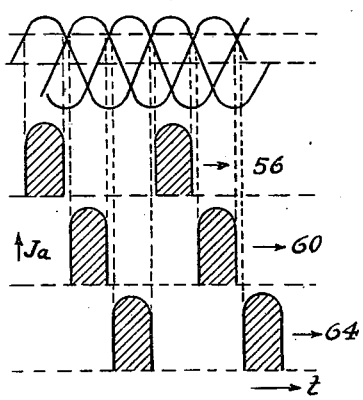
Figure 12:
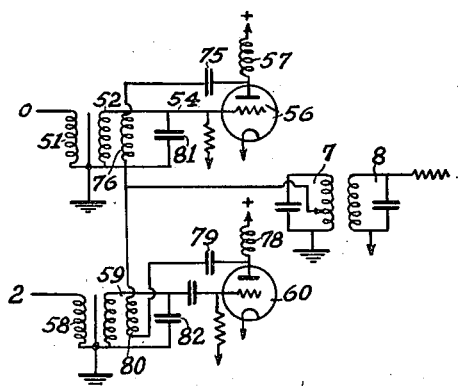
Figure 13:
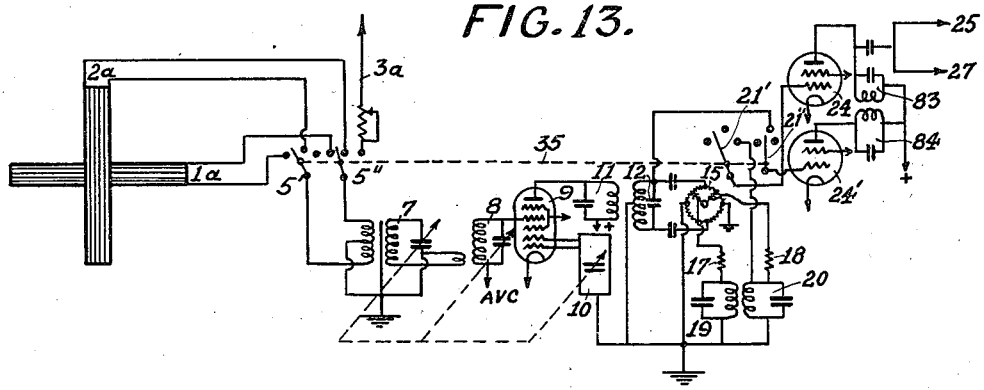
Figure 14:
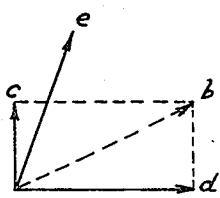
Figure 15:
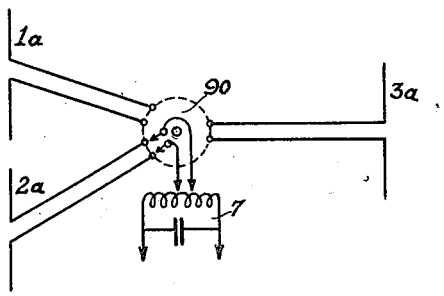

The above and further objects as well as novel aspects of the invention will become more apparent from the following detailed description taken with reference to the accompanying drawings forming part of this specification and wherein:

Figure 1 is a circuit diagram of a simple directional receiving system constructed according to and embodying the principles of the invention, Figures 2 to 4 are theoretical diagrams explanatory of the function and operation of the system according to Figure 1, Figure 5 is a diagram illustrating an improved directional receiving system according to the invention, Figure 6 is a circuit diagram for an improved system constructed according to Figure 5, Figures 7 and 8 are explanatory theoretical diagrams illustrating the operation of Figure 6, Figure 9 is a schematic view showing a commutating arrangement adapted for use in a system according to Figure 6, Figure 10 represents a diagram illustrating a purely electronic commutating system for use in Figure 6, Figure 11 is a theoretical diagram explanatory of the function of the commutating circuit according to Figure 10, Figure 12 is a partial circuit diagram illustrating a modification of Figure 6, Figure 13 represents a circuit diagram of a modified direction finding receiver constructed according to the invention, Figure 14 is a vector diagram explanatory of the function of Figure 13, and Figure 15 is a schematic diagram showing a spaced antenna arrangement suited for mounting on aircraft or other moving craft for use with a direction finding receiver of the type shown in Figure 6.

Like reference characters identify like parts throughout the different views of the drawings.

Referring more particularly to Figure 1, items 1 and 2 represent a pair of aerials or antenna elements of any suitable type located at a distance R from each other equal to a fraction of a wave length, whereby the relative time phases of the energies absorbed from an incoming electro-magnetic wave by the aerials vary as a function of the direction of propagation as is well understood by those skilled in the art. Both aerials are connected through suitable feeder lines to a pair of contacts 1' and 2', respectively, arranged to cooperate with a switch arm 5 or the like connected to the tuned input circuit 7 of a superheterodyne receiver of standard design. In the example illustrated, the circuit 7 is coupled to a secondary tuned circuit 8 to form a band-pass filter energizing the signal input grid of a pentagrid converted or electronic mixer valve 9 of known type having associated therewith a local oscillator collectively indicated by rectangle 10. The output circuit of the mixer or frequency changer valve 9 includes a circuit 11 tuned to the fixed intermediate frequency and coupled to a secondary circuit 12 also tuned to the intermediate frequency. The circuit 12 is arranged to excite a resistance type goniometer or adjustable phase shifting device 15 disclosed in greater detail in my co-pending patent application Ser. No. 320,725, filed February 24, 1940, entitled Electric phase control system. As described in said co-pending application, this phase shift device comprises a bridge having four resistance arms preferably arranged in circular formation with the input voltage to be phase shifted impressed upon one pair of diagonal points or apices of the bridge, such as the vertical apices in the case illustrated connected to the tuned circuit 12 through coupling condensers 13′ and 14′, while the remaining (horizontal) apices of the bridge circuit are connected to ground or any other zero potential point of the system. A pair of sliding contact elements 13 and 14 spaced at an angular distance of 90° are arranged for simultaneous rotation and connected to a pair of reactively coupled resonant circuits 19 and 20 placed between each of the contacts and ground in series with decoupling resistances 17 and 18, respectively. By the proper design of the resistance arms forming the bridge circuit; that is, in such a manner that the potential between the contacts 13 and 14 and ground varies according to a sine or cosine law, respectively, with respect to the angular position of the contacts, the phase of the currents in the tuned circuits 19 and 20 will be shifted directly in proportion to the angle α or position of the contacts through the full 360° rotation, thus making this arrangement a simple and highly efficient phase shifting device.

Item 24 is an electron tube having its input grid excited alternately by the potential developed in the aerials 1 and 2, the latter after additional phase shift by means of the device 15, 17—20. For this purpose, there is provided a switch 21 operating in synchronism with the switch 5 by the aid of a common connecting mechanism indicated at 6 and cooperating with a pair of contacts 22 and 23, the former being connected directly to the tuned circuit 12 through coupling condenser 13′ and adjustable potentiometer resistance 16, and the latter being connected to the high potential side of the circuit 20 of the phase shifting system. Thus, in the left hand position of the switch arms 5 and 21, the signal from antenna 1 is directly applied to the grid of the tube 24, while in the right hand position of the switch arms 5 and 21 the signal from antenna 2 is applied to the input of tube 24 after additional phase shift introduced by the system 15, 17—20.

In operating the direction finder, the phase shift device is adjusted until the phase of the signal absorbed by antenna 2 is equal to the phase of the signal absorbed by antenna 1. The equalization of the phases is determined by the aid of a phase modulation receiver 25 of any known type such as an off-neutralized crystal filter serving as a phase modulation detector in a known manner and connected to the output of tube 24 and exciting a suitable indicator such as an indicating instrument 26, loud speaker or the like. The receiver 25 may include an absorbing filter to eliminate the interfering signal caused by the switching operation and a suitable limiting device for suppressing amplitude modulation of the signals to increase the accuracy and reliability of the direction indication. Thus, with the output or response of the indicator 26 becoming zero, the incoming direction of the signals being received by the antennae 1 and 2 will be proportional to the adjusting position of the contacts 13 and 14 of the phase shifting device which latter may be calibrated directly in angles of deviation from a predetermined zero line such as the true north-south direction. The output circuit of tube 24 in the example shown is further connected to an amplitude modulation receiver 27 energizing an indicator such as a loud speaker and serving for identifying the transmitting station being received.

In Figure 2 there are shown the successive wave trains applied to the receiver from the aerials 1 and 2 having a varying time phase depending upon the signal direction as indicated by the vectors in the drawings, the relative phase angle $\phi$ (Figure 3) between the signal impulses being a function of the direction of propagation of the signal.

A direction finding arrangement as described hereinbefore is subject to inherent ambiguity due to the fact that signals arriving from a direction forming an angle $+\alpha$ with the line connecting the aerials 1 and 2 will result in the same indication as signals arriving in a direction forming an angle $-\alpha$ with the connecting line of the aerials as will be obvious from Figure 4.

According to further feature of the invention, this ambiguity is eliminated by the employment of at least three spaced aerials arranged at the corners of a preferably equi-lateral triangle as shown in the diagram according to Figure 5. If the three aerials 0, 1 and 2 located in the manner shown are periodically connected one after the other to a common receiver and if all three signal phases are equalized in a manner so as to eliminate the additional phase modulation in the receiver, it is possible to determine and indicate the direction without ambiguity through a full angle of 360° as will be explained in detail in the following.

Assuming that the three aerials 0, 1 and 2 are located at the corners of an equi-lateral triangle and with respect to the reference line N–S (true north-south direction) as shown in Figure 5, then the phase shift of the signals received by aerials 1 and 2 in respect to the phase of the signal in aerial 0 may be expressed theoretically as follows:

$$\phi_{0_1} = -\frac{360°R}{\lambda} \cos \gamma = -\frac{360°R}{\lambda} \cos (\alpha - 30°)$$

for aerial 1  (1)

and $$\phi_{0_2} = -\frac{360°R}{\lambda} \cos \beta = -\frac{360°R}{\lambda} \cos (\alpha + 30°)$$

for aerial 2  (2)

wherein $\phi_{0_1}$ represents the phase of the signal in antenna 1 with respect to the signal in antenna 0, $\phi_{0_2}$ represents the phase of the signal in antenna 2 with respect to antenna 0, R is the distance between each two antenna, $\lambda$ represents the wave length, $\beta$ is the angle between the connecting line 0—2 and the signal direction indicated by the arrow $\alpha$, and $\gamma$ is the angle between the connecting line 0—1 and the signal direction.

If the three antennae are successively connected to the receiver by means of a suitable commutator or switching arrangement, the output signal will be phase modulated and the phases of the successive wave trains will be $0$, $\phi_{0_1}$ and $\phi_{0_2}$, respectively. In order to equalize the phases, a phase shifting or goniometer arrangement is used such as shown in Figure 6 by means of which the direction of arrival of a signal can be determined without ambiguity and in a most simple and accurate manner.

Referring more particularly to Figure 6, items 0, 1, 2 represent three antennae of any suitable type located at the corners of an equi-lateral triangle and spaced by a distance R from each other. The antennae are connected through feeder lines to the contacts 0', 1', 2', respectively, of a suitable switching device having a switch arm 5 connected to the tuned input circuit 7 of a superheterodyne receiver in substantially the same manner as shown in Figure 1. The output circuit 12 of the receiver in the present case is connected to a double phase shifting or twin-goniometer system comprising a pair of resistance bridge circuits 15 and 44 constructed in a manner similar to that described in my above mentioned co-pending application. The vertical apices of the bridge 15 are both connected to the high potential side of the circuit 12 through a coupling condenser 13'. Contrary to the arrangement of Figure 1, one of the horizontal apices of the bridge 15 is connected to ground through an adjustable resistance 40 while the other horizontal apex is connected to one of the vertical apices of the bridge 44 through an adjustable resistance 39. The horizontal apices of the bridge 44 are grounded, while the remaining vertical apex of this bridge is connected through an adjustable resistance 41 on the one hand to the low potential side of the circuit 12 by way of coupling condenser 14', and to ground through a further adjustable resistance 42 on the other hand. Bridge 15 is provided with a pair of slidable contacts 32 and 33 and bridge 49 is provided with slidable contacts 30 and 31, all four contacts being arranged in relative fixed relation to each other and ganged for rotation in unison by mounting on a common shaft carrying an operating knob 46. The twin circuits 19 and 20 are connected to contact 30 of bridge 44 on the one hand and contact 32 of bridge 15 on the other hand through resistors 17 and 18, respectively. A pair of additional twin circuits 34 and 35 are connected to contact 31 of bridge 44 and contact 33 of bridge 15 through resistors 36 and 37, respectively, in the manner shown. The switch arm 21 operating synchronously with the switch arm 5 is arranged to cooperate with contact 22 connected to a potentiometer 16 in a manner similar to that shown in Figure 1, and further contacts 23 and 28 connected to the high potential sides of resonant circuits 20 and 35, respectively. Switch arm 21 is connected to input grid of the tube 24 energizing phase modulation and amplitude modulation receivers 25 and 27 in a manner similar to that shown in Figure 1.

As pointed out hereinabove and explained in detail in my above mentioned co-pending application, if a potentiometer arrangement as shown at 15 and 44 in Figure 6 is excited by an input signal source connected to one pair of (vertical) apices with the remaining (horizontal) apices being grounded and provided with a pair of contacts angularly spaced by 90° and connected to a twin circuit system (19, 20 or 34, 35, respectively), a continuous phase shift of the current or potential supplied by the circuits 20 or 35 from zero to 360° may be effected by rotation of the contacts, this phase shift being directly proportional to the angular position of the contacts with respect to a suitable zero line such as the line connecting the vertical apices of the bridge circuit, provided the resistance of the bridge varies according to a cosine function with respect to a complete angular rotation from this line.

If three antennae are used as described and the distance R between the antennae is less than ½ the wave length, the phase angle between the potentials developed in the antennae will never reach 180° and in fact, its maximum value will be equal to $$\frac{360°R}{\lambda}$$

that is, the additional phase shift required in the circuits 20 and 35 need never exceed this value which in case of $$R = \frac{1}{10}$$

amounts to only 36°. Since this phase shift, as above pointed out, varies according to the cos of the angle $\alpha$ of arrival of the radio wave, the phase shifting potentiometer is designed to effect a phase variation from $-36°$ to $+36°$ in the above example in order to obtain a suppression or compensation of the phase modulation in the output circuit for direction indicating purposes. This limited phase variation range is obtained by the provision of the adjustable resistances 39—42, and should also follow a cosine law by suitable design of the potentiometer resistances 15 and 44 as is understood from the above.

In the arrangement according to Figure 6, a bridge circuit is connected across the circuit 12, one arm of which comprises two quarter segments of 15, the resistance 40 being grounded and resistance 42. The second arm comprises the remaining quarter segments of 15, resistance 39, the two halves of the bridge 44 having their mid points grounded and resistance 41. The two bridges 15 and 44 are required in order to effect a simultaneous differential phase variation in the circuits 20 and 35 between $$-\frac{360°R}{\lambda}$$

and $$+\frac{360°R}{\lambda}$$

As pointed out, this may be obtained by the proper design of the potentiometer resistance 15 and 44 and the additional resistors 39—42. It can be shown that with the antennae positioned according to Figure 5 and the contacts 32 and 33 of potentiometer 15 spaced by angles of 60 and 120° with respect to the zero (vertical) line and with the contacts 30 and 31 of potentiometer 44 arranged at angular distances $+30°$ and $-30°$, rotation of the knob 46 until the phase modulation disappears in the output (zero indication in 26) will result in a true direction indication of the incoming signal by the position of the contact 32 in the example illustrated.

In the position of the contacts shown corresponding to a signal arriving in the north-south direction, the relative amplitudes of the signals impressed upon the twin circuits 19—20 and 34—35 by the potentiometers 15 and 40 are alike resulting in an equal phase shift of the signals received by the antennae 1 and 2 and consequent equalization with the phase of the signal received by the antenna 0. For any other direction to the left and right from this reference (north-south) line, the relative amplitudes will vary differentially resulting in a corresponding variation of the phase shift in the circuits 20 and 35 in such a manner that equalization of all phase shifts is obtained with the contact 32 assuming an angular position directly corresponding to the signal direction, providing a proper design of all the circuit elements as explained hereinabove.

The accuracy of the direction indication may be improved by increasing the signal frequency by the aid of a suitable frequency transformer connected to the output of tube 24. In this manner a small phase difference can be increased thereby increasing the accuracy of the direction indication.

Direction finding arrangements according to the invention as described in the foregoing are designed for a single frequency only. If it is desired to employ the system over an extended range of receiving frequencies, the resistors 39—42 have to be adjusted differently for each frequency. This re-adjustment may be carried out automatically by ganging the resistances with the remaining tuning adjustments of the receiver as indicated in the drawings at 10'.

In Figure 9 there is shown a commutating arrangement suited for use in Figure 6. The arrangement comprises a pair of insulating drums 45 and 46 mounted upon a common shaft 44 driven by a suitable prime mover such as an electromotor. The drums are provided with conducting segments 47 connected to slip rings 48 and 49, respectively. The antennae are connected to brushes 0', 1' and 2' of drum 45 and the output of the receiver is connected to the brushes 22, 23 and 36 of drum 46. In this manner brush 0' operates in synchronism with brush 22, brush 2' operates in synchronism with brush 23, and brush 1' operates in synchronism with brush 36. The conducting segments 47 determining the switching periods may be designed in any suitable manner such as to obtain very short interruptions or to obtain a certain overlap between the switching periods. Moreover, the segments may have a different length to obtain varying switching periods for the different aerials to suit any existing requirements. The switching frequency may be chosen in a suitable manner so as not to produce an audible note in the receiver 27 or it may be at audible frequency in which case the interfering signal in the receiver may be suppressed by the aid of a suitable rejector or other filter network.

It will be understood that any other suitable switching arrangement as well as phase shift device known in the art can be used for practicing the invention without departing from the spirit and principle thereof. Thus, the switching may be carried out purely electronically, i. e. substantially without any moving mechanical parts subject to wear and other defects. A suitable electronic switching system is shown in Figure 10. In the latter 0'', 2'' and 1'' represent the end of the feeding lines supplying the signal energy from the three antennae according to Figure 5. The signals are transmitted through aperiodic transformers having primaries 51, 58 and 62 and secondaries 52, 59, 60' which may be rendered aperiodic by the provision of shunt resistors as shown. These transformers energize the input grids of three vacuum tubes 56, 60 and 64, respectively, by way of suitable coupling condensers and grid-leak resistances. The anodes of the tubes 56, 60 and 64 are connected together and to the positive pole of a space current source indicated by the plus sign on the one hand, and to the input circuit 7 of the superheterodyne receiver through suitable coupling condenser on the other hand. There are provided three further control tubes 65, 66 and 67 alternately rendered conductive and non-conductive by a three-phase generator or oscillator 68 each phase of which serves to energize the control grid of one of the tubes. The three-phase generator 68 may be of any suitable type producing an audio or superaudible frequency such as described in my above mentioned co-pending application. The anode circuits of tubes 65, 66 and 67 include coupling condensers 69, 71 and 73 and choke coils 70, 72 and 74, respectively, each in series with a grid biasing battery or the like for switching tubes 56, 60 and 64, respectively. The potentials across the choke coils 70, 72 and 74 and the respective biasing batteries are impressed upon the grids of the switching tubes 56, 60 and 64. The steady bias for the latter provided by the biasing batteries is such as to normally render the tubes non-conductive and to decrease the negative bias in rapid succession in accordance with the controlling potential supplied by the oscillator 68, as is understood by reference to Figure 11 showing the successive conducting cycles in relation to the three-phase control potential. By proper adjustment of the fixed bias on the grids of the tubes 56, 60 and 64, the interrupting and switching periods can be given any desired duration and overlap to suit existing requirements. A similar electronic switching arrangement may be provided controlled by the same source or timing oscillator 68 for connecting the output tube 24 in synchronism with the antenna circuits in a manner readily understood from the above.

In place of aperiodic input transformers as shown in Figure 10, the transformer secondaries may be shunted by fixed condensers 81, 82 as shown in Figure 12 in which case it is advantageous to provide an inverse feedback from the anode of valves 56 and 60 through coupling condensers 75 and 79 and feedback coils 76 and 80, respectively. In this case the connection of the receiver should be made to a suitable tap point of the circuit 7 in order to prevent undesirable interaction between the transformers 51—52 and 58—59. In Figure 12 only two circuits have been shown for simplicity of illustration, but obviously any number such as three circuits may be provided for a three-antennae system with all the inverse feedback coils connected together and to the tap of circuit 7.

Figure 13 shows another embodiment of the invention comprising a pair of orthogonal loop aerials 1a and 2a which may be replaced by aerial systems of the well known Marconi-Adcock type. Item 3a represents an open or omni-directional antenna connected to an adjustable resistance for equalizing its signal amplitude with the signals absorbed by each loop antenna. The receiver shown is similar to that according to Figure 1 with the switching arrangement being constructed in such a manner that at first the loops and thereafter the open antenna are connected to the receiver in succession by means of a double switch device having switch arms 5' and 5". Similarly, the output of the receiver is connected to a double switch 21'—21" arranged so that at first the signal from one loop (1a) is connected to the input of valve 24 and thereafter the signal from the second loop (2a) is applied to the input of a further valve 24'. In the third position of the switches 5'—5" and 21'—21", the open antenna signal is applied to the valve 24 after previous phase shift in the arrangement, 15, 17—20 which is similar to that described hereinbefore, but may be replaced by any other suitable phase shift device known in the art. The anode circuits 24 and 25 include a pair of parallel tuned critically coupled resonant circuits 83 and 84 the output of the receivers 25 and 27 being derived from one of these circuits, in the example shown circuit 83. As described in the above mentioned co-pending application, if both circuits 83 and 84 are energized simultaneously, the phase of the current or potential (b according to Figure 14) supplied by the circuit 83 will correspond to the true signal direction. If, on the other hand, the circuits are connected in succession instead of simultaneously as provided for in Figure 13, the phase of the output signal will jump in rapid succession between the position c and d, Figure 14, while the mean phase position will again be as shown in b. By means of the phase shifting device 15 the phase e of the signal supplied by the open antenna is adjusted to the same phase whereby the adjustment of the potentiometer will be a direct indication of the true direction within a full range of 360° free from any ambiguity. As is understood, the switching arrangement may be constructed in any suitable manner for instance such that the switching between the loops 1a and 2a is at speed n times faster than the switching between the loops of the open antenna. Thus, for instance, the switching may be according to the following schedule: 1a—2a—1a—2a—1a—2a—1a—2a—3—1a—2a—1a—2a—1a—2a—1a—2a—3, etc. In this case too the direction is determined by causing the signal of the phase modulation receiver to become zero in substantially the same manner to that described hereinbefore.

The system in Figure 6 is specially suited for mounting upon movable vehicles such as on aircraft. Since the three antennae can be mounted conveniently such as shown in Figure 15 wherein 1a, 2a and 3a indicate dipole aerials, 7 indicates the input circuit of the receiver and 90 indicates the switch connecting the three dipoles to the receiver in rotation. An arrangement of this type is characterized by its great simplicity and is free from the effects of so-called night error and accordingly well suited for direction finding by means of short waves.

The receivers hereinbefore described may be equipped with any desired controls such as automatic volume and automatic tuning control inasmuch as the direction finding operation is based upon a comparison of phase and the bearing indication is substantially unaffected by any amplitude and tuning control. Automatic volume and tuning control is desirable with certain types of phase demodulators to ensure accurate and reliable results. The system of switching according to the invention is superior to known systems in the art employing phase measurement due to the fact that no additional phase shift is introduced in the receiving circuits or in other words, that the receiver provides an output signal having the same time phase position for the signals derived from the individual antennae, excepting the phase shift introduced within the receiver for direction finding purposes which can be measured with great accuracy.

As is understood, any known type of phase indicator or demodulator may be used for the purpose of the invention to ascertain phase equalization in the output connected to the amplifier 24.

From the foregoing it wil be apparent that the invention is not limited to the specific circuits and arrangement of parts as well as steps described and disclosed herein for illustration but that the underlying idea and principle is susceptible of numerous variations and modifications coming within the broader scope and spirit as defined in the ensuing claims. The specification and drawings are accordingly to be regarded in an illustrative rather than a limiting sense.

I claim:

1. A radio direction finding system comprising three antennae located at the corners of a triangle, a receiver, an output circuit and a plurality of transmitting channels, switching means for periodically connecting said antennae to the input of said receiver in rapid succession, further switching means operating synchronously with said first switching means for successively and periodically connecting said antennae to said output circuit through said receiver and an associate transmitting channel, phase modulation response and indicating means connected to said output circuit, phase shifting means arranged in at least two of said transmitting channels, and means comprising a common operating member for said phase shifting means for simultaneously differentially adjusting the time phases of the signals in the respective transmitting channels.

2. A radio direction finding system comprising three antennae located at the corners of an equilateral triangle, a receiver having an input circuit, an output circuit and a plurality of transmitting channels each coordinated to one of said antennae, switching means for periodically connecting said antennae to said input circuit in rapid succession, further switching means operating synchronously with said first switching means for successively and periodically connecting said output circuit to said receiver through an associate transmitting channel, phase modulation response and indicating means connected to said output circuit, phase shifting means arranged in at least two of said transmitting channels, and means comprising a common operating member for said phase shifting means for simultaneously differentially adjusting the time phases of the signals in the respective transmitting channels, and scale means calibrated in directional angles arranged to cooperate with said operating member.

3. A radio direction finding system comprising three antennae located at the corners of an equi-lateral triangle, a receiver having an input circuit and an output circuit, switching means for periodically connecting said antennae to said input circuit in rapid succession, further switching means operating synchronously with said first switching means, means whereby one of said antenna elements is directly connected to said output circuit through said receiver during a first simultaneous current conducting cycle of said first and second switching means, a pair of phase shifting devices associated with said receiver having a common adjusting member for simultaneously differentially shifting the phase of signals applied thereto, and further means whereby during the remaining successive conducting cycles of said first and second switching means the signals received by each of the remaining antennae are applied to said output circuit after phase shift by said phase shifting device, and scale means calibrated in directional angles arranged to cooperate with said operating member.

4. In a direction finding system as claimed in claim 7, said receiver being of the superheterodyne type and said phase shifting means consisting of a first and second bridge circuit each comprising four equal resistance elements, and a pair of sliding contacts at a predetermined relative spacing cooperating therewith, said resistance elements being designed to produce a sinusoidal variation of the voltage between each contact and one pair of opposite apices of the bridge from a voltage applied to the remaining apices of the bridge, a circuit connection from the high potential side of said input circuit to a pair of diagonal apices at the first bridge, a connection from one of the remaining apices of the first bridge to the potential reference point of said system through a first variable resistance, a further connection from the remaining apex of the first bridge to an apex of said second bridge through a second variable resistance, the opposite apex of the second bridge being connected to the low potential side of said input circuit through a third variable resistance, a fourth variable resistance connected between the low potential side of said input circuit to the potential reference point of the system, means for connecting the remaining diagonal apices of the second bridge to the potential reference point of said system, two pairs of reactively coupled resonant circuits all tuned to the intermediate frequency, the resonant circuit of each pair being connected between a contact of each of said bridges and the reference point of said system, connections between one resonant circuit of each pair to said second switching means, a common operating member for all four contacts of both said bridge circuits, the contacts of each bridge being arranged relative to each other and to the contacts of the other bridge, and said first, second, third and fourth resistance being adjusted so as to cause differential phase shift of the signal potentials derived from two of said antennae prior to their application to said output circuit through said second switching means, whereby with the disappearance of the phase modulation of the combined signal from all three antennae in said output circuit the position of said operating member is representative of the direction of propagation of a radio signal being received by said antenna.

JOZEF PLEBANSKI.

CERTIFICATE OF CORRECTION.

Patent No. 2,284,475.  May 26, 1942.

JOZEF PLEBANSKI.

It is hereby certified that the above numbered patent was erroneously issued to the inventor, said PLEBANSKI, whereas said patent should have been issued to --Radio Patents Corporation, a corporation of New York-- as assignee of the entire interest therein, as shown by the record of assignments in this office; and that the said Letters Patent should be read with this correction therein that the same may conform to the record of the case in the Patent Office.

Signed and sealed this 21st day of July, A. D. 1942.

(Seal)

Henry Van Arsdale,
Acting Commissioner of Patents.